United States Patent
Duncan et al.

(10) Patent No.: US 7,052,662 B2
(45) Date of Patent: May 30, 2006

(54) NOX, HG, AND $SO_2$ REMOVAL USING ALKALI HYDROXIDE

(75) Inventors: Joanna L. Duncan, Sanford, ME (US); Christopher R. McLarnon, Exeter, NH (US); Francis R. Alix, Rye, NH (US)

(73) Assignee: Powerspan Corp., Portsmouth, NH (US)

( * ) Notice: Subject to any disclaimer, the term of this patent is extended or adjusted under 35 U.S.C. 154(b) by 761 days.

(21) Appl. No.: 10/064,280

(22) Filed: Jun. 28, 2002

(65) Prior Publication Data

US 2003/0108472 A1 Jun. 12, 2003

Related U.S. Application Data

(63) Continuation-in-part of application No. 09/683,267, filed on Dec. 6, 2001, now Pat. No. 6,936,231.

(51) Int. Cl.
*B01D 53/60* (2006.01)

(52) U.S. Cl. ............. 423/235; 423/242.1; 423/243.06; 423/243.08; 423/243.11; 588/301; 588/320

(58) Field of Classification Search ............... 423/235, 423/242.1, 243.06, 243.08, 243.11; 204/174, 204/177; 588/301, 320
See application file for complete search history.

(56) References Cited

U.S. PATENT DOCUMENTS

| | | | |
|---|---|---|---|
| 4,028,071 A | 6/1977 | Langlois | |
| 4,029,482 A | 6/1977 | Postma et al. | |
| 4,029,739 A | 6/1977 | Senjo et al. | |
| 4,035,470 A | 7/1977 | Senjo et al. | |
| 4,120,671 A | 10/1978 | Steinmeyer | |
| 4,155,726 A | 5/1979 | Steinmeyer | |
| 4,193,774 A | 3/1980 | Pilat | |
| 4,345,916 A | 8/1982 | Richards et al. | |
| 4,435,260 A | 3/1984 | Koichi et al. | |
| 4,650,555 A | 3/1987 | Rzad et al. | |
| 4,690,807 A | 9/1987 | Saleem | |
| 4,726,940 A | 2/1988 | Kobayashi | |
| 4,735,927 A | 4/1988 | Gerdes et al. | |
| 4,735,930 A | 4/1988 | Gerdes et al. | |

(Continued)

FOREIGN PATENT DOCUMENTS

WO    WO-99/47268 A1    9/1999

(Continued)

OTHER PUBLICATIONS

Lee, etal. "The Effect of In Situ Generated Ammonia—Sufer Aerosols on the Removal of NOx in a Wet ESP", Aug. 20, 2001, Mega Symposium, Chicago, IL.

*Primary Examiner*—Stanley S. Silverman
*Assistant Examiner*—Peter J. Lish
(74) *Attorney, Agent, or Firm*—Phillip E. Decker; Mesmer & Deleault, PLLC

(57) ABSTRACT

A process and apparatus for removing $SO_2$, NO, and $NO_2$ from a gas stream having the steps of oxidizing a portion of the NO in the flue gas stream to $NO_2$, scrubbing the $SO_2$, NO, and $NO_2$ with an alkali scrubbing solution, and removing any alkali aerosols generated by the scrubbing in a wet electrostatic precipitator. The process can also remove Hg by oxidizing it to oxidized mercury and removing it in the scrubbing solution and wet electrostatic precipitator. Alkali sulfates, which are valuable fertilizers, can be withdrawn from the rubbing solution.

7 Claims, 4 Drawing Sheets

U.S. PATENT DOCUMENTS

| | | | |
|---|---|---|---|
| 4,806,320 A | 2/1989 | Nelson | |
| 4,892,718 A | 1/1990 | Peter et al. | |
| 4,971,777 A | 11/1990 | Firnhaber et al. | |
| 4,999,167 A * | 3/1991 | Skelley et al. | 422/175 |
| 5,023,063 A | 6/1991 | Stiles | |
| 5,041,271 A * | 8/1991 | Aoki et al. | 423/235 |
| 5,176,888 A | 1/1993 | Stiles | |
| 5,229,091 A | 7/1993 | Buchanan et al. | |
| 5,308,385 A | 5/1994 | Winn | |
| 5,316,737 A * | 5/1994 | Skelley et al. | 422/170 |
| 5,362,458 A | 11/1994 | Saleem et al. | |
| 5,547,648 A | 8/1996 | Buchanan et al. | |
| 5,624,649 A | 4/1997 | Gal | |
| 5,658,547 A | 8/1997 | Michalak et al. | |
| 5,715,764 A | 2/1998 | Lyngfelt et al. | |
| 5,723,838 A * | 3/1998 | Shin et al. | 204/157.3 |
| 5,792,238 A | 8/1998 | Johnson et al. | |
| 5,846,301 A | 12/1998 | Johnson et al. | |
| 5,871,703 A | 2/1999 | Alix et al. | |
| 5,985,223 A * | 11/1999 | Saxena et al. | 423/235 |
| 6,063,352 A | 5/2000 | Risse et al. | |
| 6,117,403 A | 9/2000 | Alix et al. | |
| 6,132,692 A | 10/2000 | Alix et al. | |
| 6,136,284 A * | 10/2000 | Hwang et al. | 423/235 |
| 6,159,440 A | 12/2000 | Schoubye | |
| 6,168,709 B1 | 1/2001 | Etter | |
| 6,183,708 B1 | 2/2001 | Hei et al. | |
| 6,193,934 B1 | 2/2001 | Yang | |
| 6,203,598 B1 * | 3/2001 | Hasegawa et al. | 95/92 |
| 6,221,325 B1 | 4/2001 | Brown et al. | |
| 6,277,343 B1 | 8/2001 | Gansley et al. | |
| 6,277,344 B1 | 8/2001 | Hei et al. | |
| 6,284,022 B1 | 9/2001 | Sachweh et al. | |
| 6,302,945 B1 | 10/2001 | Altman et al. | |
| 6,312,505 B1 | 11/2001 | McQuigg et al. | |
| 2001/0033817 A1 | 10/2001 | Sander | |
| 2001/0045162 A1 | 11/2001 | McQuigg et al. | |

FOREIGN PATENT DOCUMENTS

| | | |
|---|---|---|
| WO | WO-01/87464 A1 | 11/2001 |
| WO | WO=02/062453 A1 | 8/2002 |

* cited by examiner

US 7,052,662 B2

NOX, HG, AND SO₂ REMOVAL USING ALKALI HYDROXIDE

CROSS REFERENCE TO RELATED APPLICATIONS

This is a continuation-in-part of U.S. Ser. No. 09/683,267, filed Dec. 6, 2001, now U.S. Pat. No. 6,936,231.

BACKGROUND OF INVENTION a. Field of the Invention

This invention relates to methods and apparatuses for removing NOx, Hg, and $SO_2$ from a gas stream.

b. Description of the Related Art

Fossil fuels are burned in many industrial processes. Electric power producers, for example, burn large quantities of coal, oil, and natural gas. Sulfur dioxide ("$SO_2$"), nitrogen oxide ("NO"), and nitrogen dioxide ("$NO_2$") are some of the unwanted byproducts of burning any type of fossil fuel. Mercury ("Hg") is often also found in fossil fuels. These byproducts are known to have serious negative health effects on people, animals, and plants, and a great deal of research has been done to find a way to economically remove them from flue gas streams before they enter the atmosphere.

$SO_2$ is often removed from gas streams ("desulfurization") by scrubbing the gas with an aqueous ammonium sulfate solution containing ammonia. Examples of this process are disclosed in U.S. Pat. Nos. 4,690,807, 5,362,458, 6,277,343, and 6,221,325, which are not admitted to be prior art by their mention in this Background section. The absorbed sulfur compounds react with ammonia to form ammonium sulfite and ammonium bisulfite, which are then oxidized to form ammonium sulfate and ammonium bisulfate. The ammonium bisulfate is further ammoniated to form ammonium sulfate. The process does not remove NO or $NO_2$, however, which must then be dealt with using a different process.

NO and $NO_2$ (together known as "NOx") can be removed from a gas stream by contacting the gas stream with either $ClO_2$ or $O_3$ to convert NO into $NO_2$, and then scrubbing with an aqueous solution of a sulfur-containing reducing compound of alkali metals or ammonia, and a catalytic compound. Such a process is disclosed in U.S. Pat. No. 4,029,739, by Senjo et al., which is not admitted to be prior art by its mention in this Background section. This process, however, does not remove $SO_2$, and requires the addition of chlorine or ozone into the system by some other means.

Some processes exist that remove both NOx and $SO_2$. In one such process disclosed in U.S. Pat. No. 4,035,470, by Senjo et al., which is not admitted to being prior art by its mention in this Background section, NO is oxidized to $NO_2$ by contacting the gas with either $ClO_2$ or $O_3$ as above. Then the $SO_2$ is scrubbed with a sulfite and an oxidation retardant that suppresses oxidation of the sulfite to sulfate. Iron or copper compounds can also be added to depress oxidation. Optionally, ammonium hydroxide can be added to make sulfite and to react with $CO_2$ in the gas stream to make carbonate. Like in U.S. Pat. No. 4,029,739 mentioned above, this process requires the addition of either chlorine or ozone, and further requires a consumable sulfite oxidation retardant. The referenced patent did not mention whether the byproducts included any valuable material like ammonium sulfate. However, both U.S. Pat. Nos. 4,029,739 and 4,035,470 require the addition of chlorine to a gas stream that is eventually released to the atmosphere, creating a serious safety concern.

Yet another process for removing NOx and $SO_2$ from a gas stream is disclosed in U.S. Pat. No. 4,971,777, by Firnhaber et al., which is not admitted to be prior art by its inclusion in this Background section. In this process, NO is oxidized to $NO_2$ by the addition of organic compounds which decompose into radicals at high temperatures. Then an aqueous ammonia solution in which the pH is adjusted to be below 5.0 absorbs the NOx and $SO_2$. Firnhaber teaches the importance of holding the scrubbing solution to a low pH, since higher pH levels produce aerosols of the ammonia salts that he says is an environmental burden to be thwarted. Ammonia aerosols are formed by gas phase reactions of ammonia vapor in the scrubber and create a blue haze or white vapor that emanates from the stack. This is also called "ammonia slip." Free ammonia in the atmosphere would be a serious health and environmental hazard. Firnhaber dismisses the possibility of aerosol removal means due to prohibitive investment costs and high pressure loss, for instance.

The typical method of removing mercury is to add activated carbon to the gas stream in order to absorb the mercury, and then mercury-containing activated carbon is collected in a bag house. This has the disadvantage of requiring an expensive particulate additive just to absorb one material, and a requiring bag house to collect the particles that were added.

What is needed, therefore, is a process that removes $SO_2$, Hg, NO, and $NO_2$ from a gas stream that does not require addition to the gas stream of a catalyst, chlorine, ozone, or activated carbon, can occur at relatively high pH, and does not result in ammonia slip.

SUMMARY OF INVENTION

The present invention is directed to a process and apparatus that removes $SO_2$, Hg, NO, and $NO_2$ from a gas stream that does not require the addition of a catalyst, chlorine, ozone, or activated carbon, occurs at a relatively high pH, and does not result in ammonia slip. A process that satisfies these needs comprises the steps of oxidizing NO to $NO_2$ and Hg to oxidized mercury, scrubbing $SO_2$, NO, and $NO_2$ from the flue gas stream with an alkali scrubbing solution having a pH greater than six, and removing any alkali aerosols generated by the scrubbing steps and oxidized mercury with an aerosol removal means. A portion of the oxidized mercury may be removed from the gas stream with the scrubbing solution. These and other features, aspects, and advantages of the present invention will become better understood with reference to the following description, drawings, and claims.

DETAILED DESCRIPTION

The present invention is a process and apparatus for removing $SO_2$, Hg, NO, and $NO_2$ from a gas stream, especially from the flue gas stream of a fossil fuel boiler. In practice, flue gas from the combustion of fossil fuel nearly always contains more NO than $NO_2$, and often contains Hg, which can also be removed from the gas stream by this invention.

The inventors are familiar with methods and apparatuses for removing $SO_2$ and NOx from gas streams. U.S. Pat. Nos. 5,871,703, and 6,117,403 teach the use of an electrical discharge apparatus to oxidize $SO_2$ and NOx to form sulfuric and nitric acids respectively, collecting the acids in a wet electrostatic precipitator ("WESP") to form an effluent, and processing the effluent to make industrial grade acids that can be sold. It also teaches converting NO to $NO_2$. The inventors on these two patents are Alix, Neister, and McLarnon, two of whom are inventors of the present invention. U.S. Pat. No. 6,132,692 teaches the use of a dielectric barrier discharge ("DBD") reactor to form the same acids, collecting them in a WESP, and draining them from the WESP to remove them from a gas stream. The inventors on this patent are Alix, Neister, McLarnon, and Boyle, two of whom are inventors of the present invention. The above three patents were owned by the owner of the present invention as of the filing date of this specification. They are hereby incorporated by reference as if completely rewritten herein.

Figure 1:
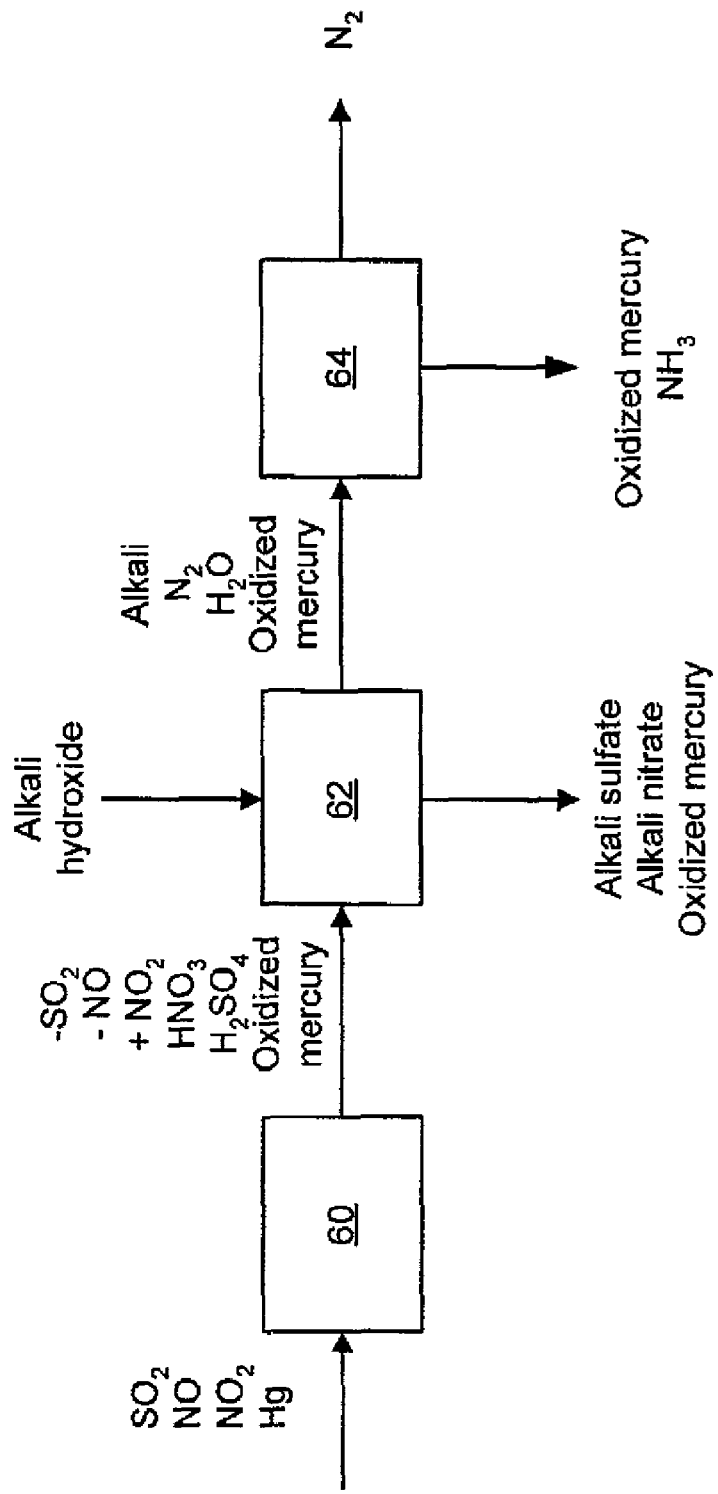
FIG. 1 is a process flow chart showing the process of the present invention.

The present invention comprises a three-step process as shown in FIG. 1. A gas stream comprising $SO_2$, NO, $NO_2$, and perhaps Hg, are present prior to the first step 60. The first step 60 is oxidizing at least a portion of the NO in the flue gas to $NO_2$ with an oxidizing means. The means selected should be able to oxidize greater than about two percent of the NO to $NO_2$, and is preferably in the region of about ninety percent.

The oxidizing step should be adjusted so that the resulting mole ratio of $SO_2$ to $NO_2$ after the oxidizing step should be at least 2 to 1. The ratio is preferably four to one, but can be greater. The oxidizing means 60 can be any means known in the art, including but not limited to using an electrical discharge reactor, and injecting $ClO_2$, $O_3$ or certain organic compounds. For example, U.S. Pat. Nos. 4,029,739 and 4,035,470 teach converting NO to $NO_2$ by the addition of $ClO_2$ or $O_3$ into the gas stream. U.S. Pat. No. 4,971,777 teaches the addition of certain organic compounds that decompose into radicals at high temperatures.

Examples of suitable electrical discharge reactors include corona, pulsed corona, e-beam, and DBD. DBD is synonymously referred to as silent discharge and non-thermal plasma discharge. It is not the same as corona discharge or pulsed corona discharge. The preferred embodiment uses a DBD reactor, such as that disclosed in U.S. Pat. No. 6,132,692, by Alix, et al. In practice, the operator of the process will adjust the power input to the reactor to attain the desired oxidation results as a function of the cost of power input to the reactor, desired scrubbing results, and other factors. Laboratory testing has shown that oxidation of at least 90% of the NO and Hg is readily attainable with the present invention.

As taught in U.S. Pat. No. 6,132,692, a DBD reactor will oxidize at least a portion of the NO and $NO_2$ in a gas stream to nitric acid, and at least a portion of the $SO_2$ in a gas stream to sulfuric acid. These acids are dealt with in the next step of the process.

If oxidizing means other than an electrical discharge reactor is used, Hg may or may not be oxidized to oxidized mercury or HgO. As used in this specification, the term "oxidized mercury" is intended to include any or all of the forms of oxidized mercury that are known in the art, including without limitation, HgO and $Hg^{++}$. On the other hand, it is possible, and perhaps desirable, that some of the NO and $NO_2$ becomes further oxidized to form $HNO_3$ regardless of the means used. The reason why this may be desirable will be made clear later in this specification.

Another way to carry out the oxidizing step 60 is adding an alkene such as ethene or propene to the flue gas followed by oxidizing NO to $NO_2$ with an oxidizing means, such as the electrical discharge reactor. This would have the advantage of reducing the power input requirement of the electrical discharge reactor to get the same amount of NO to $NO_2$ oxidation. The alkene can be added in about a 0.3:1 molar ratio of propene to NO, or 0.5 molar ratio of ethene to NO. The likely chemical reaction mechanisms for the conversion of NO to $NO_2$ in the case where ethene is the alkene selected for use with an electrical discharge reactor are as follows:

$$C_2H_4 + OH \rightarrow HOCH_2CH_2 \tag{1}$$

$$HOCH_2CH_2 + O_2 \rightarrow HOC_2H_4OO \tag{2}$$

$$NO + HOC_2H_4OO \rightarrow NO_2 + HOC_2H_4O \tag{3}$$

$$HOC_2H_4O + O_2 \rightarrow HOCH_2CHO + HO_2 \tag{4}$$

$$NO + HO_2 \rightarrow NO_2 + OH \tag{5}$$

In any event, the output gas stream comprises $SO_2$, less NO, more $NO_2$, perhaps $HNO_3$, perhaps $H_2SO_4$, and perhaps oxidized mercury, as shown in FIG. 1.

The second step 62 is scrubbing at least a portion of the $SO_2$, NO, and $NO_2$ present in the gas stream with an aqueous alkali or ammonium scrubbing solution. Some of the oxidized mercury may also be scrubbed in this step 62. For the purposes of this specification, ammonium shall be considered an alkali. The term "scrubbing" typically means "absorbing" to people having skill in the art, meaning that $SO_2$, NO, and $NO_2$ is absorbed by the aqueous solution. However, it is intended that the term "scrubbing" as used in this specification also includes adding anhydrous ammonia to the scrubbing solution to initiate the reactions leading to the oxidation of $SO_2$ and reduction of $NO_2$.

The solution preferably comprises at least one alkali, alkali sulfite, alkali sulfate, and water. The alkali can be any one that is capable of maintaining the scrubbing solution at the desired pH. Preferably, the alkalis are one or more of ammonium, sodium, and potassium. The solution preferably has a pH greater than six, which is much higher than that taught by Firnhaber. Firnhaber teaches that the pH must be kept to less than five, and is preferably 4.5, to prevent the formation of aerosols. However, the present invention is not concerned with avoiding the formation of aerosols because it includes an aerosol removal means 64, described later in this specification.

Maintaining a relatively high pH has several benefits. It increases the speed of absorption of $SO_2$. It increases the ratio of sulfite available in solution compared to bisulfite, which facilitates the oxidation of $SO_2$ and reduction of $NO_2$. The ratio of sulfite to bisulfite is highly dependent on pH level. From these benefits, it follows that the absorption vessel, shown as item 44 in FIG. 2, can be substantially smaller than that used to scrub the same amount of $SO_2$ in a conventional limestone scrubber which is the most typical $SO_2$ scrubber in use today. In addition, the amount of scrubbing liquid required and the liquid to gas ratio can be reduced. It is estimated that the size of the absorption vessel 44 can be reduced by half, and the liquid to gas ratio can be reduced by 75%. Because the cost of the absorption vessel and liquid circulating equipment represent a large fraction of the total cost of a scrubber, the ability to substantially reduce the size of the vessel and associated pumps and piping is a major advantage of the present invention over the prior art.

Although FIG. 1 shows alkali hydroxide being added at this step, anhydrous ammonia in the form of ammonium hydroxide can be added instead. The alkali hydroxide reacts with the gas stream output from the oxidizing step, forming alkali sulfite and alkali bisulfite. The likely chemical reactions in this step, in the case of ammonia, potassium hydroxide, and sodium hydroxide, are as follows:

$$NH_3 + H_2O + SO_2 \rightarrow NH_4HSO_3 \tag{6}$$

$$NH_4HSO_3 + NH_3 \rightarrow (NH_4)_2SO_3 \tag{7}$$

$$2NH_4OH + SO_2 \rightarrow (NH_4)_2SO_3 + H_2O \tag{8}$$

$$2KOH + SO_2 \rightarrow K_2SO_3 + H_2O \tag{9}$$

$$2NaOH + SO_2 \rightarrow Na_2SO_3 + H_2O \tag{10}$$

An oxidation inhibitor can be added at this step to inhibit the oxidation of sulfite to sulfate before the sulfite can perform its $NO_2$ reduction function. Examples of oxidation inhibitors include thiosulfate, thiourea, sulfide, and emulsified sulfur.

The alkali bisulfite and alkali sulfite react with the NO and $NO_2$ to form their alkali bisulfate and alkali sulfate. Ammonium sulfate and potassium sulfate, for example, are well known as valuable agricultural fertilizers. The likely reactions that take place in this step, in the case where potassium is the alkali, are as follows:

$$2NO_2 + 4K_2SO_3 \rightarrow 4K_2SO_4 + N_2 \tag{11}$$

$$NO + NO_2 + 3K_2SO_3 \rightarrow 3K_2SO_4 + N_2 \tag{12}$$

There are corresponding reactions for the case when ammonium and/or sodium are used as the alkali.

Most of the $HNO_3$ that may have been formed by further oxidation of NO and $NO_2$, and/or created by a DBD reactor, will react with the alkali and form its alkali nitrate. Potassium nitrate and ammonium nitrate are also known to be valuable agricultural fertilizers, and are formed according to the following formulae:

$$HNO_3 + NH_3 \rightarrow NH_4NO_3 \tag{13}$$

$$HNO_3 + KOH \rightarrow KNO_3 + H_2O \tag{14}$$

If another alkali is used, it will react with the nitric acid to form alkali nitrate. In a similar way, most of the sulfuric acid created by the DBD reactor will react with the solution and form alkali bisulfate, which can be further reacted to form an alkali sulfate. As one can see from the above equations, the process removes $SO_2$, NO, and $NO_2$ from the gas stream, and produces alkali nitrate, alkali sulfate, and nitrogen. Over time, the alkali sulfate and alkali nitrate will concentrate in the aqueous alkali scrubbing solution and precipitate out of solution. The solid precipitate can then be removed from the scrubber and processed for use as fertilizer, or land filled.

The gas stream after the scrubbing step comprises nitrogen and water. Since the pH of the scrubbing solution is higher than about five, the output from the scrubbing step will likely contain aerosols and ammonia vapor if ammonia was used. If not collected in the scrubbing solution, the gas stream will also contain oxidized mercury.

The third step 64 is removing at least a portion of the aerosols and the remainder of the oxidized mercury, if present, from the gas stream. A wet electrostatic precipitator ("WESP") and/or mist eliminator may be used as the aerosol removal means. A WESP is effective at collecting alkali aerosols, oxidized mercury, and any other aerosols or particles that may be present in the gas stream.

As a result of this three-step process, $SO_2$, NO, $NO_2$, and Hg are removed from a gas stream to provide alkali sulfate and alkali nitrate. The output of the aerosol removal means comprises $N_2$ as a result of the process of the present invention.

Figure 2:
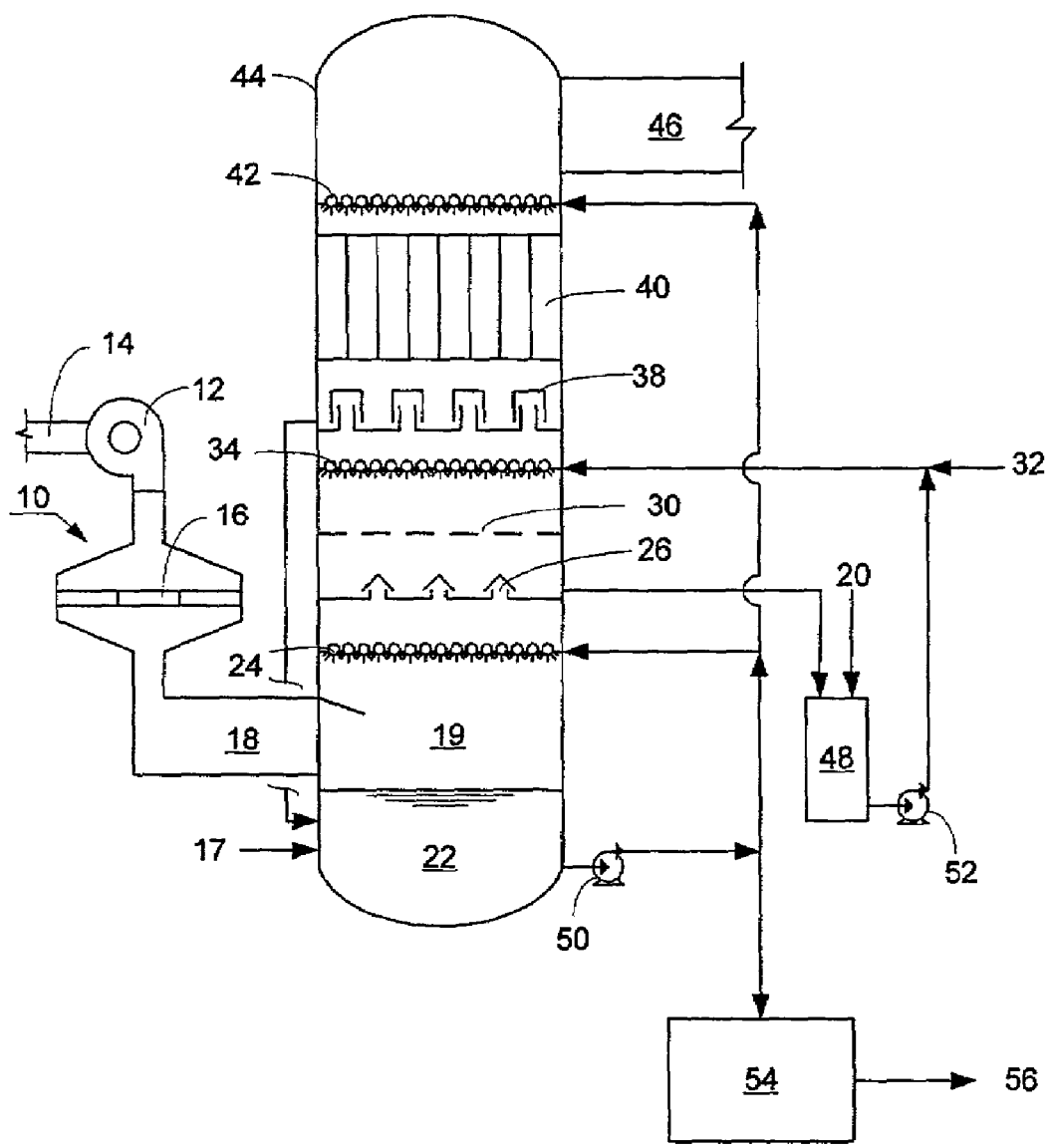
FIG. 2 is a cut-away view of an apparatus according to the present invention.

An apparatus according to the present invention is shown in FIG. 2. A gas stream 14 comprising $SO_2$, NO, $NO_2$, and perhaps Hg enters the apparatus assisted by a forced draft fan 12. The gas then enters a means for oxidizing 10 at least a portion of the NO in the gas stream to $NO_2$. The oxidation means 10 performs the oxidizing step 60 shown in FIG. 1, which is more fully described above. In the preferred embodiment, at least one DBD reactor is used as an oxidizing means, and can be provided in modules 16 to facilitate manufacture and installation. At least one power supply and controller is required to operate a DBD reactor, which are selected by those having skill in the art, but are not shown in the drawings.

After the oxidation means 10, the gas stream 18 comprises less $SO_2$, less NO, more $NO_2$, perhaps $HNO_3$, perhaps $H_2SO_4$ and perhaps oxidized mercury. The gas stream temperature at this point is about 175° C. (350° F.). The gas stream then enters a scrubbing vessel 44 into a region 19 over an aqueous alkali sulfate solution 22. Preferably, the aqueous alkali sulfate solution comprises the alkali, alkali sulfite, alkali sulfate, and water. Some of the water in the alkali sulfate solution 22 evaporates due to the heat of the incoming gas stream 18, thus concentrating the solution. A portion of the solution 22 is pumped by a circulation pump 50 to a filtration/granulation apparatus 54, which is shown in FIG. 2 as a black box. The apparatus 54 actually comprises many parts, and is readily designed by persons having ordinary skill in the art. The output of the filtration/granulation apparatus 54 is a solid alkali sulfate/nitrate product 56, which can be sold as an agricultural fertilizer, depending on the alkali used.

Air 17 is introduced into the alkali sulfate solution 22 for oxidizing alkali sulfite into alkali sulfate. Alkali sulfate solution 22 is pumped with a circulation pump 50 also to a set of lower spray nozzles 24 that serve to cool and saturate the gas stream 18 with the aqueous solution. Some of the solution is also pumped by circulation pump 50 to the WESP spray header 42 to wet the WESP 40 electrode surfaces.

Another circulation loop is provided wherein aqueous alkali sulfite and sulfate in a vessel 48 is pumped with a circulation pump 52 to a set of upper spray nozzles 34. The liquid then falls to a dual flow tray 30. A separator tray 26 allows some of the liquid to fall into the alkali sulfate solution 22, and the remainder is piped to the vessel 48. Makeup water 20 is added directly to the vessel 48. Makeup alkali 32 is added to the upper spray nozzles 34. These two circulation loops, independently or together, perform the scrubbing step 62 of FIG. 1, which is described in detail above.

Following the scrubbing loops, a WESP 40 is provided to remove any oxidized mercury leaving the scrubbing loop and alkali aerosols that may have formed earlier in the process. The WESP 40 is preferably a shell-and-tube type of WESP, but can be a plate type, or any WESP such as is known by those having skill in the art. The WESP 40 is wetted using a set of sprays 42 fed from the scrubbing solution 22 and circulation pump 50. A bubble cap tray 38 can be provided below the WESP 40. A portion of the liquid in the bubble cap try 38 may be diverted directly to the scrubbing solution section 22 before falling through the scrubbing loops. The WESP 40 is an example of the aerosol removal means 64 described in FIG. 1, which can also be a mist eliminator alone or a combination of mist eliminators and WESPs. The gas stream exiting the WESP 40 has considerably less NOx and $SO_2$ than that which entered the process and apparatus, and has an increased amount of the reaction products, which are nitrogen and water.

The following laboratory-scale examples of the process demonstrate the efficacy of the present invention:

EXAMPLE 1

An absorption test was done for the scrubbing step of the process of the present invention, with a solution that was 1% w/w $SO_3^{2-}$ ("sulfite"), 6% w/w $SO_4^{2-}$ ("sulfate"), and 2.5% $S_2O_3^{2-}$ ("thiosulfate") in a packed column that was 46 cm (18 inches) high and 3.8 cm (1.5 inches) in diameter. The column was packed with 6.35 mm (0.25 inch) glass RASCHIG rings. The simulated flue gas at the inlet of the column contained 13% v/v moisture, 6% v/v $O_2$ and the simulated flue gas pollutants listed in Table 1. There was continuous addition of $NH_3$ and $(NH_4)_2S_2O_3$ to maintain a pH of 6.8 and a thiosulfate concentration of 2.5% w/w. The residence time in the column was 1.8 sec with an L/G ratio of 25 gpm/kacfm.

Table 1 shows the concentrations of NO, $NO_2$, and $SO_2$ at the inlet and outlet of the test system.

[t1]

TABLE 1

Scrubbing Step Alone

|  | System Inlet | System Outlet |
|---|---|---|
| NO (ppmv) | 20 | 4 |
| $NO_2$ (ppmv) | 250 | 36 |
| $SO_2$ (ppmv) | 1370 | 2 |

EXAMPLE 2

An absorption test was done to determine steady state operating conditions for a system with inlet flue gas conditions of 7 ppmv NO, 248 ppmv $NO_2$, 1485 ppmv $SO_2$, 6% v/v $O_2$ and balance $N_2$. NaOH and $NaS_2O_3$ were added to the solution to maintain a pH of 8.0 and a thiosulfate concentration of 1%. The concentrations of sulfite and sulfate in the system were allowed to build to steady state. The $NO_x$ removal rate was 77% at concentrations of $SO_3^{2-}$, $SO_4^{2-}$, and $S_2O_3^{2-}$ of 1.25% w/w, 9.5% w/w, and 1.0% w/w respectively.

EXAMPLE 3

Tests were conducted in a laboratory test facility for the NO oxidizing, scrubbing, and aerosol removal steps of the process of the present invention. The equipment consisted of a simulated flue gas delivery system, a coaxial cylinder DBD reactor, a packed column scrubber and a tubular WESP. The following is an example of data obtained in the lab test facility.

Simulated flue gas was delivered to the DBD reactor at a flow rate of 0.4 m³/minute (14 scfm), a temperature of 143° C. (290° F.) and with the following composition: 6.2% v/v $O_2$, 14.2% v/v $CO_2$, 8.2% v/v $H_2O$, 20 ppmv CO, 250 ppmv $C_2H_4$, 1740 ppmv $SO_2$, and 259 ppmv $NO_x$. Gas velocity through the discharge reactor was 15.2 m/s (50 ft/s) with a discharge power level of 140 watts. Gas from the discharge reactor entered a 10.2 cm (4 inch) ID packed column scrubber, packed with 1.3 cm (0.5 inch) INTALOX saddles to a depth of 1.2 m (4 ft.). Liquid was introduced at the top of the scrubber at a flow rate of 1.25 liters/minute (0.33 gpm) (L/G=20 gpm/kacfm). Aqueous ammonia was added to and effluent liquid removed from the recirculating scrubber solution to maintain a constant total liquid volume and solution pH at 6.6. Gas from the packed bed scrubber was treated in a 10.2 cm (4 inch) ID wetted wall electrostatic precipitator with a gas residence time of 0.7 seconds.

Table 2 below shows the concentrations of NO, $NO_2$ and $SO_2$ at the inlet to the system, the outlet of the barrier discharge reactor and at the outlet of the system.

[t2]

TABLE 2

Three Step Process

|  | System Inlet | Discharge Reactor Outlet | System Outlet |
|---|---|---|---|
| NO (ppmv) | 254 | 45 | 32 |
| $NO_2$ (ppmv) | 5 | 109 | 9 |
| $SO_2$ (ppmv) | 1740 | 1598 | 1 |

Figure 3:
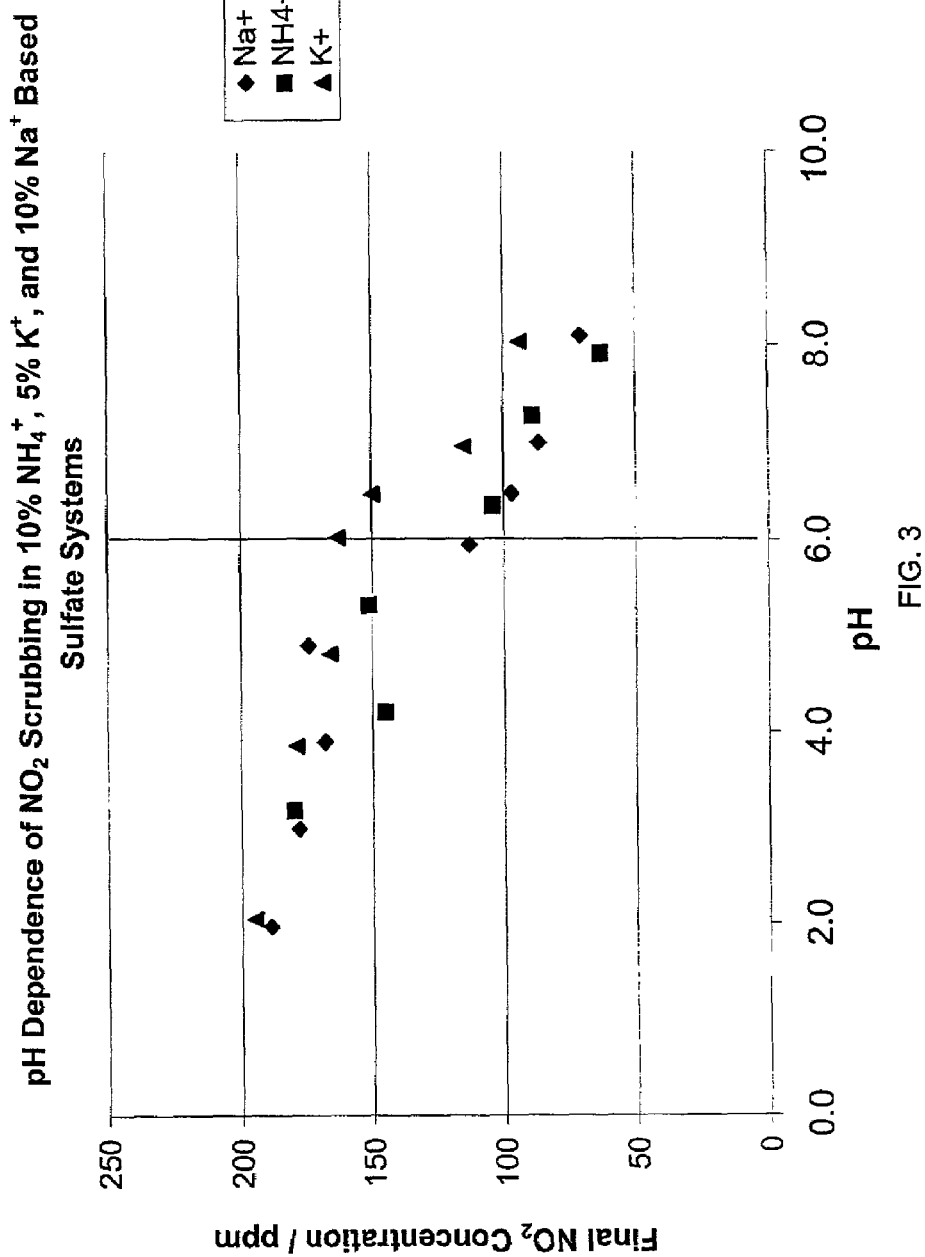
FIG. 3 is a chart showing final $NO_2$ concentration from various alkalis as a function of pH.
Figure 4:
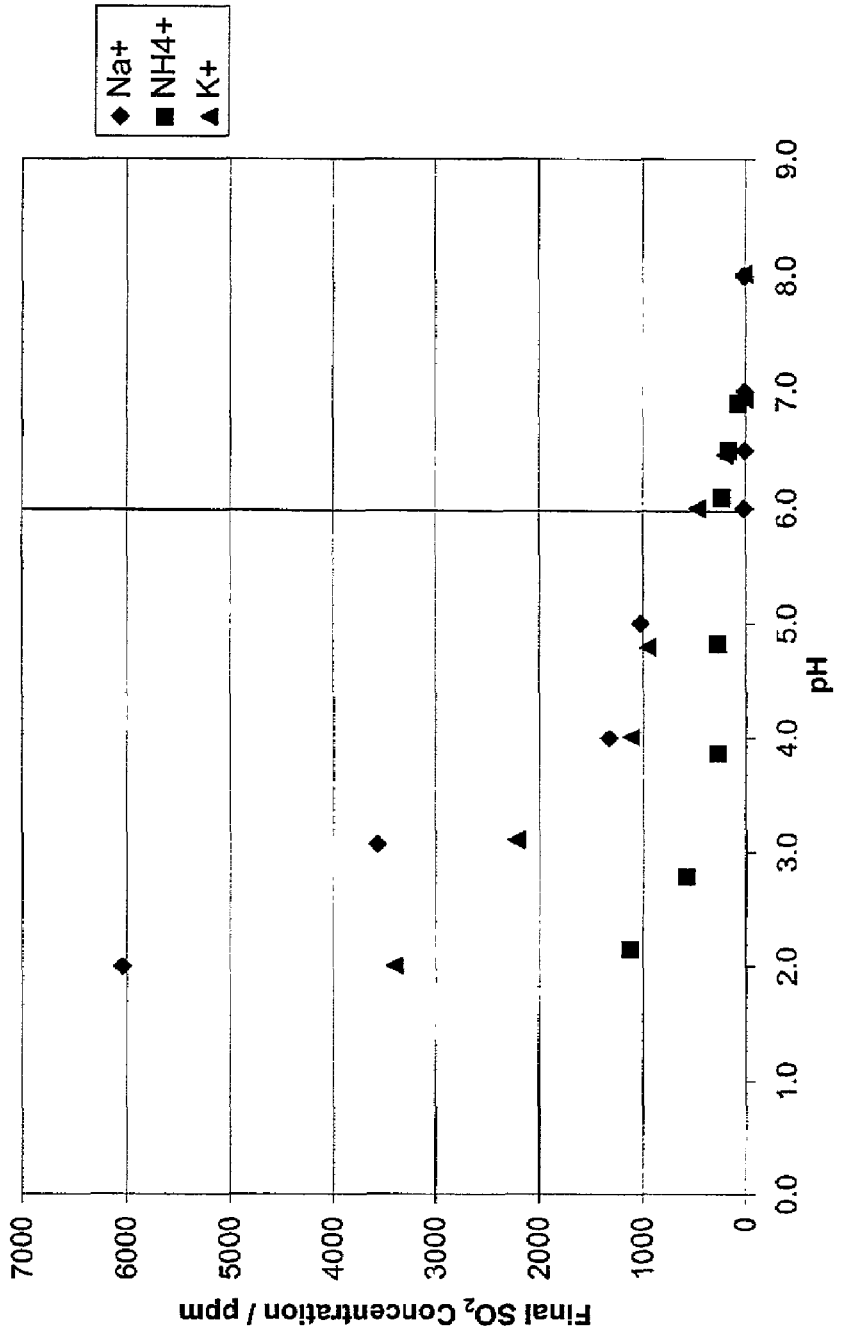
FIG. 4 is a chart showing final $SO_2$ concentration from various alkalis as a function of pH.

FIG. 3 is a chart showing actual experimental data of final $NO_2$ concentrations in a process according to the present invention as a function of pH. The results using sodium, ammonium, and potassium are shown as different data sets. The initial conditions were a temperature of 54° C. (130° F.), 0.5% $SO_3^{2-}$ concentration, and initial $SO_2$ concentration of 1500 ppm. FIG. 4 is a chart showing actual experimental data of final $SO_2$ concentrations in a process according to the present invention as a function of pH. The results using sodium, ammonium, and potassium are shown as different data sets. The initial conditions were a temperature of 54° C. (130° F.), 0.5% $SO_3^{2-}$ concentration, and initial $NO_2$ concentration of 250 ppm.

The three-step process and apparatus described herein was designed specifically to treat flue gas from a coal fired power plant. However, it can be appreciated that the invention is capable of operating on any gas stream in which NOx and $SO_2$ are present, including but not limited to gas and oil-fired boilers and various chemical manufacturing processes. The NOx and $SO_2$ concentrations and operating conditions will be different in each situation. Therefore, it is understood that an operator or system designer will be motivated to modify the scrubbing step 62 to possibly eliminate the need for either one or both the oxidizing step 60 or the aerosol removal step 64, or combine the three elements somehow so that fewer than three steps are needed.

It will be apparent to those skilled in the art that various changes and modifications can be made without departing from the spirit of the present invention. Accordingly, it is intended to encompass within the appended claims all such changes and modifications that fall within the scope of the present invention.

The invention claimed is:

1. A process for removing $SO_2$, NO, and $NO_2$ from a gas stream comprising the steps of
  a. oxidizing at least a portion of NO in a gas stream to $NO_2$ with an electrical discharge reactor, said oxidizing step further comprising adding an alkene to the gas stream upstream of the electrical discharge reactor, followed by b. scrubbing at least a portion of $SO_2$, NO, and $NO_2$ from the gas stream with a scrubbing solution comprising an alkali hydroxide in an amount sufficient to maintain a pH greater than 5, and c. removing at least a portion of any alkali aerosols generated from the scrubbing step from the gas stream with an aerosol removal means.

2. The process of claim 1, wherein said alkene is at least one taken from the group consisting of ethene and propene.

3. The process of claim 1, wherein said electrical discharge reactor is a dielectric barrier discharge reactor.

4. The process of claim 3, further comprising the step of oxidizing at least a portion of the NO to $HNO_3$ with said dielectric barrier discharge reactor.

5. A process for removing $SO_2$, NO, $NO_2$, and Hg from a gas stream comprising the steps of a. oxidizing at least a portion of NO in a gas stream to $NO_2$, and at least a portion of the Hg in a gas stream to oxidized mercury, with an electrical discharge reactor, said oxidizing step further comprising adding an alkene to the gas stream upstream from the electrical discharge reactor, followed by b. scrubbing at least a portion of $SO_2$, NO, and $NO_2$ from the gas stream with a scrubbing solution comprising an alkali hydroxide in an amount sufficient to maintain a scrubbing solution pH greater than 5, and c. removing at least a portion of any alkali aerosols generated from the scrubbing step, and oxidized mercury not captured in the scrubbing step, from the gas stream with an aerosol removal means.

6. The process of claim 6, wherein said alkene is at least one taken from the group consisting of ethene and propene.

7. The process of claim 6, wherein said electrical discharge reactor is a dielectric barrier discharge reactor.

* * * * *